United States Patent [19]
Murphy et al.

[11] 3,804,609
[45] Apr. 16, 1974

[54] METHOD OF GAS PANEL CONSTRUCTION

[75] Inventors: Thomas J. Murphy, Rhinebeck; Donald M. Wilson, Kingston, both of N.Y.

[73] Assignee: International Business Machines Corporation, Armonk, N.Y.

[22] Filed: Dec. 30, 1971

[21] Appl. No.: 214,151

[52] U.S. Cl............................ 65/59, 65/50, 65/60
[51] Int. Cl............................................. C03c 17/04
[58] Field of Search........................... 65/50, 59, 60

[56] References Cited
UNITED STATES PATENTS
3,457,615  7/1969  Ikeda et al. .................... 29/25.42
3,526,550  9/1970  Larson et al. .................... 65/59 X Primary Examiner—Arthur D. Kellogg
Attorney, Agent, or Firm—Ralph L. Thomas

[57] ABSTRACT

A new method of constructing a gas panel is described which involves passivation of the outer surface of laminated electrical conductors disposed in parallel on glass plates which form a gas panel, spraying a slurry composed of a finely ground glass frit in a suspension vehicle to cover completely the laminated parallel lines on each glass plate, and firing the assembly in an oven to reflow the glass frit thereby to form a protective glass coating over the laminated parallel lines of each glass plate. The glass plates are formed into a panel by separating them a given distance, placing a sealing material between the glass plates around the periphery thereof, and firing the assembly in an oven to seal the glass plates together with a chamber therebetween which is evacuated and filled with an illuminable gas.

11 Claims, 4 Drawing Figures

METHOD OF GAS PANEL CONSTRUCTION

CROSS-REFERENCES TO RELATED APPLICATIONS OF THE SAME ASSIGNEE

Application Ser. No. 214,348 filed on Dec. 30, 1971 for Gas Panel Fabrication by Peter H. Haberland et al.

Application Ser. No. 214,150 filed on Dec. 30, 1971 for Method of Protecting Electrical Conductor Terminations During Gas Panel Fabrication by Peter R. Wagner et al.

BACKGROUND OF THE INVENTION

1. This invention relates to gas panels and more particularly to an improved method of constructing gas panels.

2. In the past various types of gas panels were constructed, and many different types of materials were used. In numerous types of such construction very small and very thin parallel electrical conductors were deposited on substrates, and a pair of such substrates were disposed on opposite sides of a chamber filled with an illuminable gas with one set of the parallel electrical conductors extending orthogonally with respect to the other set of parallel electrical conductors thereby to define coordinate intersections. A given one of the parallel electrical conductors from each set was energized with electrical signals to ignite the region of the illuminable gas around a selected coordinate intersection. The electrical conductors were made as narrow and thin as possible in order to obtain a greater number of coordinate intersections per square inch of the gas panel. This provided greater resolution so that numbers, letters, characters, and the like could be depicted more precisely on the gas panel. Since the electrical conductors were very small in width and very small in depth, they were easily attacked or pitted, and in some cases destroyed in part, in the panel fabrication process by reaction with the materials of which the gas panel was constructed, chemical agents, high temperatures involved in some steps of the process, thermal and mechanical stresses, shock from handling operations, or a combination of these factors. It is important to protect and thereby preserve uniform width, depth, and length of the small electrical conductors throughout the process of constructing a gas panel as well as thereafter protecting them from mechanical stress and shock and from reacting with the illuminable gas when the gas panel is placed in operation. It is to the problem of providing such protection that the present invention is directed.

SUMMARY OF THE INVENTION

It is a feature of this invention to provide an improved method of constructing a gas panel which protects the very small electrical conductors during panel fabrication.

It is a feature of this invention to provide an improved method of gas panel construction which is highly effective in preserving and protecting very small electrical conductors throughout the steps of panel fabrication, particularly during steps which involve elevated temperature firing or baking operations.

It is another feature of the novel method according to this invention to passivate, or render passive and non-reactive, laminated electrical conductors whereby such conductors thereafter are not attacked or destroyed during subsequent fabrication operations.

It is a further feature of the novel method according to this invention to apply a protective glass coating of uniform depth over small electrical conductors on a substrate by spraying a slurry of powdered glass frit in a suspension vehicle.

It is a still further feature of the novel method according to this invention to spray the slurry with precision by regulating the blower pressure and speed of the spray equipment relative to the substrate and to spray in a clean stage, or highly pure atmosphere, using freon vapor from a generator which heats liquid freon instead of using air from a compressor as the propellent for the spraying equipment since all usually contains contaminants, such as oil, from the compressor thereby to provide a spray which is uniform and pure as to its content and precise as to its thickness of deposition.

It is yet another feature of the improved method according to this invention to provide a protective coating by spraying glass frit in a slurry to a uniform depth over electrical conductors on a substrate, drying the slurry, and firing the assembly to reflow the glass frit which adheres to the substrate and forms a protective coating of uniform depth over the electrical conductors.

In a preferred method of construction according to this invention a gas panel is constructed using two plates spaced a given distance apart and sealed therebetween around the periphery thereof to form a chamber therebetween for holding an illuminable gas with each gas plate having electrically conductive parallel lines disposed thereon adjacent to the chamber with the electrically conductive parallel lines on one plate extending orthogonally to the electrically conductive parallel lines on the other plate. The parallel conductors on each plate are preferably made of a laminate which includes a first layer of chromium disposed on each plate, a second layer composed of copper disposed on the first layer, and a third layer composed of chromium disposed on the second layer. The total thickness of each laminated conductor is approximately 12,000A, and the width of each laminated conductor is such that there are approximately 50 conductors per inch with sufficient space between conductors to provide electrical isolation. Each glass plate of the assembly is heated in a forming gas to form a layer of chromium oxide on the outer surface of the third layer composed of chromium thereby to passivate the laminated parallel lines or render them passive or non-reactive to subsequent firing operations. A finely ground glass frit in a suspension vehicle is sprayed over the laminated parallel lines on each plate. The blower pressure and the speed of movement of the spray gun relative to the surface of the gas plates is regulated thereby to provide uniform spreading of the glass frit on the glass plates as well as precise control of the thickness of the resulting coating. The assembly is fired in an oven to reflow the glass frit which thereby forms a protective glass coating over the laminated electrically conductive parallel line. The passivation process protects the very small electrical conductors from attack during this firing operation. The resulting glass coating thereafter protects these electrical conductors during firing operations in the fabrication process particularly when the two glass plates are sealed together to form a chamber therebetween for holding an illuminable gas. The protective glass coating over the conductors serves also to isolate them from reaction with an illuminable gas subsequently inserted in the chamber. Moreover, the protective glass coating provides mechanical support to the relatively small, thin electrically conductive parallel lines which thereby enables them to survive greater shock and stress resulting from thermal changes and handling operations.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
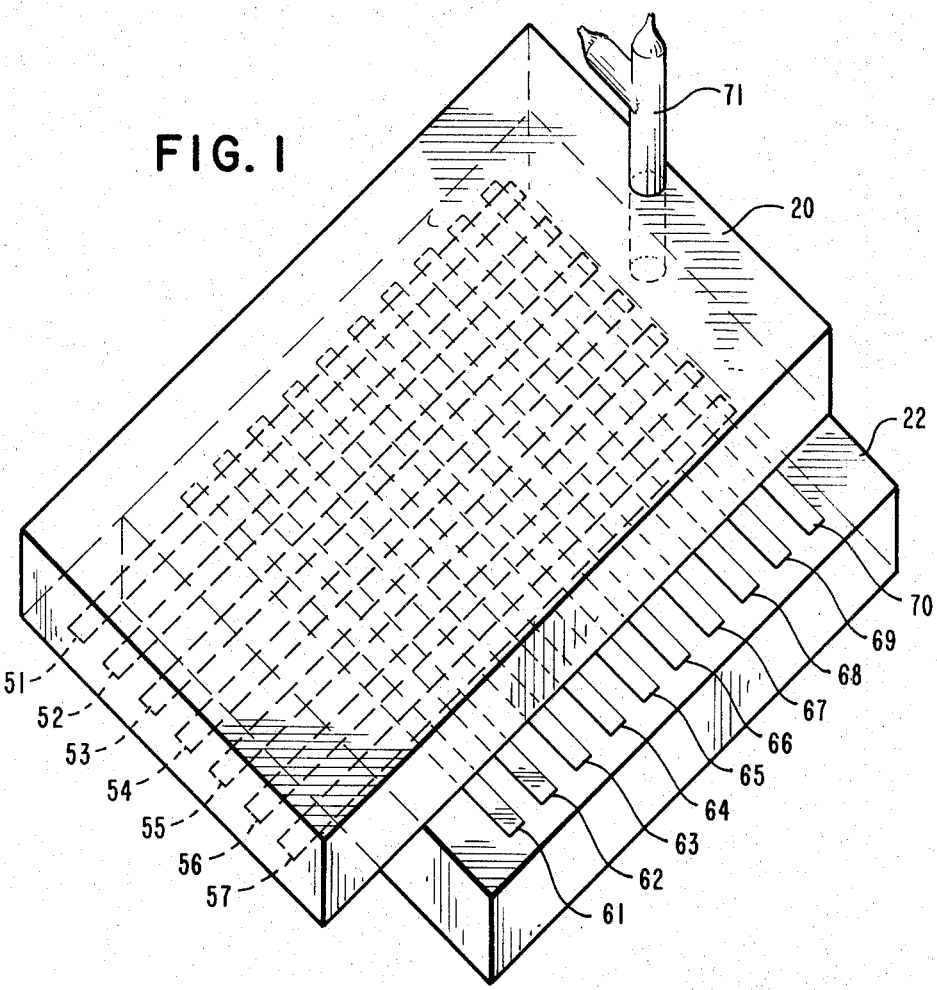
FIG. 1 is a perspective view of a gas panel constructed according to the method of this invention.

A gas panel constructed according to this invention is illustrated in FIG. 1. The gas panel includes an upper glass plate 20 disposed as shown on a lower glass plate 22. These glass plates may be one-quarter of an inch thick. A plurality of electrically conductive parallel lines 51 through 57 are disposed on the lower surface of the glass plate 20, and a plurality of electrically conductive parallel lines 61 through 70 are disposed on the upper surface of the glass plate 22. The electrically conductive parallel lines 51 through 57 are disposed orthogonally with respect to the electrically conductive parallel lines 61 through 70. These parallel electrical conductors may be laid with 50 of them per inch. The two glass plates 20 and 22 are spaced apart a given distance by suitable means, not shown, and sealed around their periphery to form a chamber therebetween for holding an illuminable gas. A bifurcated hollow glass tube 71 is used to evacuate the chamber between the glass plates and insert an illuminable glass under less than atmospheric pressure.

Figure 2:
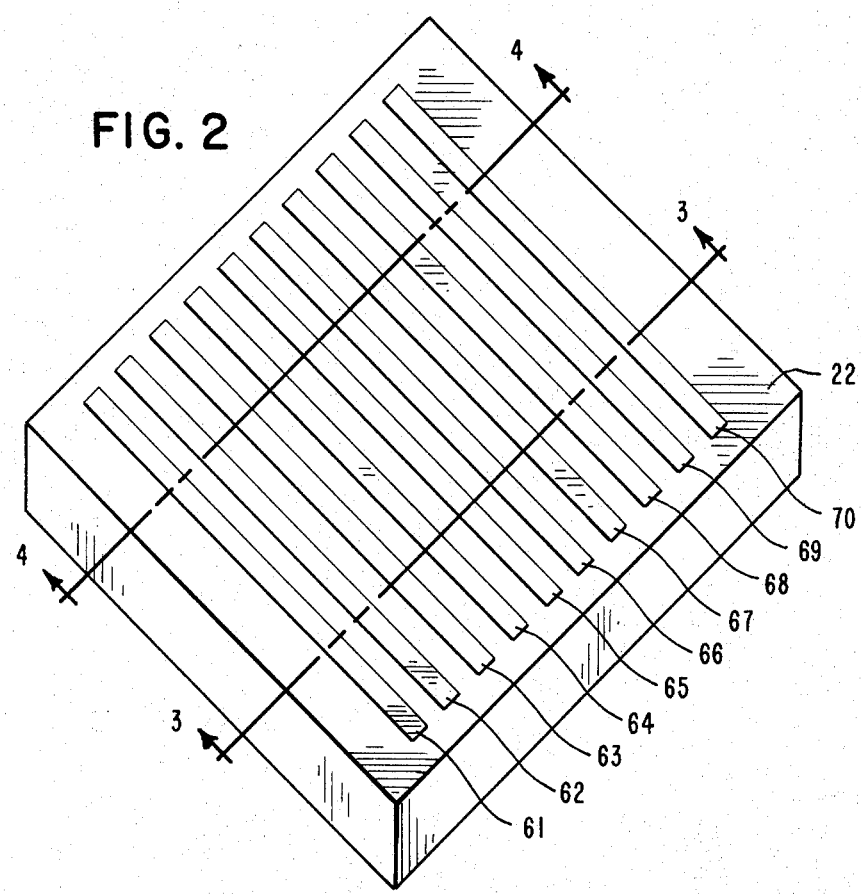
FIG. 2 is a perspective view of the lower glass plate in FIG. 1.
Figure 3:
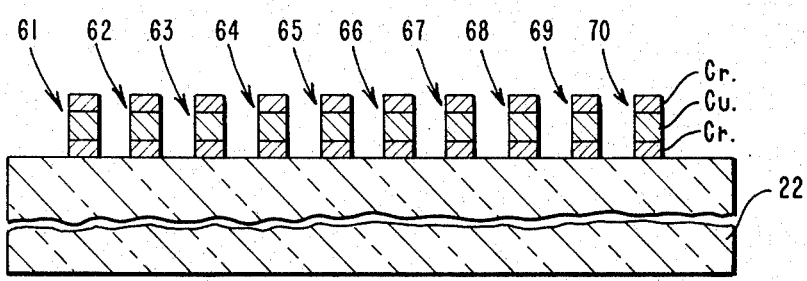
FIG. 3 is a cross-sectional view taken on the line 3—3 in FIG. 2 before a protective coating is applied to the upper surface of the lower glass plate.

The novel method according to this invention is directed to the laying of a protective glass coating over the electrically conductive parallel lines on each of the glass plates 20 and 22 in a manner which protects the electrically conductive parallel lines from attack and destruction during the process. The same technique is employed in constructing both of the plates 20 and 22 in FIG. 1, but the method is explained with respect to the glass plate 22 in FIG. 2 which is arbitrarily selected for illustrative purposes. The parallel lines 61 through 70 are deposited on the glass plate 22 using any one of several well known techniques. A preferred method of laying the electrically conductive parallel lines 61 through 70 in FIG. 2 is illustrated and described in copending appliation Ser. No. 214,348 filed on Dec. 30, 1971 for Gas Panel Fabrication by Peter H. Haberland et al. This method yields the parallel lines 61 through 70 in FIG. 2, and the parallel lines 61 through 70 in FIG. 2 are laminated as illustrated in FIG. 3 which is a cross-sectional view taken on the line 3—3 in FIG. 2. Each of the laminated parallel lines 61 through 70 in FIG. 3 is composed of a first layer of chromium about 1,000A thick disposed on the glass plate 22, a second layer composed of copper about 10,000A thick disposed on the first layer of chromium, and a third layer composed of chromium about 1,000A thick disposed on the second layer of copper.

The method according to this invention is directed to the manner of laying a protective glass coating over the laminated parallel lines 61 through 70 in FIG. 3, and it is summarized as including the following basic steps:

1. Heating the assembly of FIG. 3 in a forming gas atmosphere composed of 90% nitrogen and 10% hydrogen plus water thereby to oxidize the exposed surfaces of the chromium layers, principally the upper surface of the top or third layer composed of chromium. This is done to passivate or render non-reactive the upper surface of the top chromium layer in FIG. 3 thereby to prevent attack and partial destruction of the laminate, particularly the upper layer of chromium, during subsequent firing operations to reflow the protective glass coating.

2. Spraying finely ground glass frit in a suspension vehicle to completely cover the upper surface of the glass plate 22 in FIG. 2, and 3. Firing the assembly in an oven to reflow the glass frit thereby to form a protective glass coating over the upper surface of the glass plate 22 in FIG. 2. The protective glass coating thus formed on the upper surface of the glass plate 22 completely engulfs or envelopes all of the parallel lines 61 through 70. This glass coating protects the parallel lines 61 through 70 in FIG. 2 when the glass plates 20 and 22 subsequently are fired in an oven for the purpose of sealing them to form a chamber therebetween for holding an illuminable gas as well as isolating and protecting them permanently thereafter from contact with the illuminable gas when the chamber subsequently is filled with such gas.

The method steps outlined above are described in greater detail next. The steps of the succeeding detailed description are numbered to correspond with the basic method steps summarized above. The method steps are described in detail with respect to the glass plate 22 which is arbitrarily selected for illustrative purposes, but it is to be understood that the methodology is applicable to the processing of a glass plate in FIG. 2. It is preferable in practice to process a plurality of glass plates simultaneously.

1. The glass plate 22 in FIG. 2 with the laminated parallel lines 61 through 70 is heated in a forming gas atmosphere composed of 90% nitrogen and 10% hydrogen plus water vapor. The temperature of the gas is raised 8.5° centigrade per minute until the temperature rises to 525° centigrade. This temperature is held for 80 minutes, and it keeps the parts of the glass plate 22 at this temperature for about 50 minutes. The forming gas atmosphere is then cooled at the rate of 3.2° centigrade per minute to 300° centigrade at which point cooling may be accelerated, but care should be exercised to avoid cracking of the glass plates or oven structure. This heating operation is done to oxidize the upper or outer surface of the chromium strips disposed over the copper strips shown in FIG. 3, this passivates or renders non-reactive the upper or outer surface of the chromium strips in FIG. 3 during a subsequent heating operation to reflow a glass frit in the coating operation.

2. The laminated lands in FIG. 3 are covered with a lead glass, and this coating is applied by a spray gun on the entire upper surface of the glass plate 22 in FIG. 2. Certain preliminary operations must be performed before this is done, and they are described next. First the lead glass powder must be prepared. The lead glass is customarily received in granular form, and it must be milled before use. The milling is preferably done with aluminum oxide balls which may have a diameter of three-eighths of an inch. The aluminum oxide balls must be cleaned. This may be done by placing them in a quart size high alumina ball jar and immersing them in a solution of 10% distilled water and 90% hydrochloric acid for 15 minutes. This solution is removed, and the jar is rinsed first with water and then with ethyl alcohol. The jar with approximately 1,100 grams of the aluminum oxide balls therein is placed in an oven with the top of the jar removed, and the assembly is baked at 110° centigrade for one hour at which time the jar is removed and allowed to cool in air. Then 200 grams of granular lead glass and 200 grams of ethyl alcohol are added to the jar. A rubber gasket is placed on the top of the jar, and a cover or cap is placed on the jar and tightened to form a tight seal with the rubber gasket. The ceramic jar is placed on a ball mill and rotated for 24 hours thereby to mill the lead glass granules to a fine powder. The alcohol helps to dispurse the glass granules and the powdered frit during the milling operation. After milling is complete the content of the jar is poured into a size 400 mesh sieve. The size 400 mesh screen retains all glass particles greater than 0.0015 of an inch in diameter. The powdered glass frit which passes through the screen is dried overnight at 50° centigrade in an exhaust hood. The powdered frit then is placed in a clean pyrex dish and baked at 250° centigrade for three hours to assure dryness. It next is placed in an oven, covered with a clean glass plate, and maintained at 240° Farenheit until used. The powdered frit thus remains completely dry until ready to be mixed with a suspension vehicle for a spraying operation. Complete dryness prevents the powdered glass particles from sticking together.

The spray gun equipment is described next. A precision spray gun is used which has a regulated blower pressure and a regulated speed of movement relative to the upper surface of the plate 22 in FIG. 2. The jet size of the spray head is 0.030 of an inch in diameter. The spray gun equipment is disassembled and thoroughly cleaned in an ultrasonic cleaner, and the parts are then rinsed in acetone and dried. The inside of the spray gun is cleaned with lint-free paper soaked in acetone. The paper is removed and replaced with clean paper taped down with masking tape to prevent contamination. The filters of the spray gun equipment are replaced when dirty. Various types of spray gun equipment may be used, and one suitable type is Zicon equipment which is commercially available from Zicon Corporation of Mount Vernon, N.Y. Their R-3 nozzle and RB-5 spreader are adequate for spraying the powdered glass frit, for example.

The spray gun is loaded with a slurry of the finely ground lead glass frit and suspension vehicle when a spraying operation is to take place. The suspension vehicle is commercially available from Corning Glass Company under the name suspension vehicle, and it is composed of a nitrocellulose polymer binder in a solvent of amyl acetate. The lead glass frit is a powder which is sufficiently fine to permit spraying. The mixture used in the spray gun preferably includes 110 grams of the powdered lead glass and 110 grams of the Corning suspension vehicle. They may be blended by mixing in a blender at medium speed for three minutes or so. The resulting slurry is added to the spray gun equipment, and the slurry is sprayed uniformly over the entire upper surface of the glass plate 22 in FIG. 2. The spray gun is operated in a class 100 clean stage or enclosure having a highly clean atmosphere. A freon vapor generator preferably is used to provide freon vapor as the propellent. Liquid freon is heated to produce the vapor, and its pressure to the spray head is regulated. Freon is preferable to air as a propellent since it contains little, if any, contaminants. Compressed air from a compressor, on the other hand, has various contaminants chief of which is oil. In addition to regulated blower pressure the spray gun has regulated speed of movement relative to the upper surface of the glass plate 22 in FIG. 2. The thickness of the coating sprayed on the upper surface of the glass plate 22 in FIG. 2 is preferably 1.8 mil thick, but the thickness of the coating may be varied as desired. Spraying provides a uniform depth of the coating on the upper surface of the glass plate 22 in FIG. 2 because there is uniform disperion of powdered glass frit particles per unit volume of the slurry, and the coating is deposited at a constant rate throughout the upper surface of the plate 22 in FIG. 2. After the mixture is sprayed on the upper surface of the plate 22 in FIG. 2, it is allowed to dry for approximately 20 minutes at room temperature. The edges of the glass plate 22 are wiped after the drying operation with a lint-free cloth or paper to remove any of the dried slurry from the edges. In addition when the upper plate 20 in FIG. 1 is likewise processed, a hole in this plate for the tubulation 71 is wiped also to remove any of the dried slurry.

3. Next the plate 22 in FIG. 2 is placed in an oven on polished lava plates which previously have been leveled with a machinist's level. Grade "A" lava plates are preferred which are adjusted to be flat and parallel within 0.0002 of an inch or better. The polished lava plates are wiped with a lint-free cloth soaked in acetone before use.

The plate 22 is fired in the oven which is programmed to provide a temperature rise of 6° centigrade per minute to 200° centigrade, then 1° centigrade rise per minute to 604° centigrade, then holding the temperature at 604° centigrade for 1 hour, and thereafter decreasing the temperature 1° centigrade per minute to room temperature. This cycle is about 12 hours. This operation results in a protective glass coating over the entire upper surface of the glass plate 22 in FIG. 2. This coating preferably is about 1.8 milimeters thick, and the thickness or depth of this glass coating is uniform over all areas of the upper surface of the glass plate 22 in FIG. 2.

Figure 4:
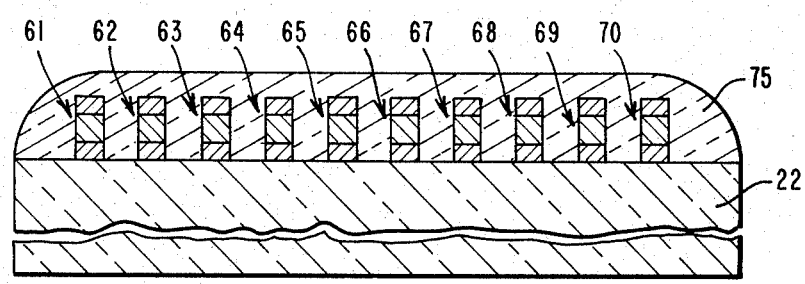
FIG. 4 is a cross-sectional view taken on the line 4—4 of FIG. 2 after a protective glass coating is disposed on the upper surface of the lower glass plate.

The resulting protective glass coating over the upper surface of the glass plate 22 in FIG. 2 is illustrated in FIG. 4 which is a cross-sectional view taken on the line 4—4 in FIG. 2 after the coating is fired in step 3 above. The dimensions are not portrayed to scale since the glass coating 75 is much thicker than the laminated parallel lines 61 through 70. The lead glass coating 75 protects the electrically conductive parallel lines from attack during subsequent firing steps of the panel fabrication. The lead glass coating is a dielectric material which isolates the electrically conductive parallel lines from the illuminable gas when the gas panel later is operated with electrical signals. The lead glass coating also provides mechanical support to the relatively thin electrically conductive parallel lines which thereby enables these lines to survive greater shock and stress.

The remaining method steps for completing construction of the gas panel, which form no part of this invention, may be briefly summarized as (1) disposing the glass plates 20 and 22 in the manner shown in FIG. 1, (2) separating them a given distance, and (3) sealing them around the periphery to form a chamber therebetween for holding an illuminable gas. The sealing material preferably is powdered glass which is fired in an oven to reflow the powdered glass and seal the plates together. The protective glass coating 75 in FIG. 4 protects the electrically conductive parallel lines 61 through 70 during this oven firing operation. In the last step (4) the resulting chamber between the glass plates 20 and 22 in FIG. 1 is evacuated through the tubulation 71, and an illuminable gas is inserted in the chamber at which time the tubulation is tipped off. Reference is made to copending application Ser. No. 214,348 filed on Dec. 30, 1971 for Gas Panel Fabrication by Peter H. Haberland et al. for a more detailed description of these method steps (1) through (4) for completing the construction of the gas panel shown in FIG. 1.

It is seen, therefore, that the novel method according to this invention provides for passivation of the electrically conductive parallel lines prior to reflowing the glass frit to form a protective glass covering. The novel method according to this invention further provides for depositing a finely ground glass frit in a suspension vehicle by the use of commercially available spray gun equipment. It was impracticable heretofore to apply glass frit with a spray gun since the frit clogged the relatively small jets in the spray gun. Adapting the glass frit to spray gun techniques according to this invention is a desirable feature since it provides for uniform deposition of the glass frit in a slurry as well as the precise control of the thickness of the resulting reflowed glass coating.

While the method of this invention has been particularly shown and described with reference to a preferred embodiment thereof, it will be understood by those skilled in the art that various changes in form and details may be made therein without departing from the spirit and scope of the invention.

What is claimed is:

1. In a method of constructing a gas panel with two glass plates spaced apart a given distance and sealed around the periphery thereof to form a chamber therebetween for holding an illuminable gas, each glass plate having parallel lines which are electrically conductive disposed thereon adjacent to the chamber with the parallel lines on one plate extending orthogonally to the parallel lines on the other plate, the parallel lines on each plate being composed of a laminate which includes a first layer composed of chromium disposed on the glass plates, a second layer composed of copper disposed on the first layer, and a third layer composed of chromium disposed on the second layer, the improved method of placing a protective coating over the parallel lines comprising the steps of:
   1. heating each glass plate in a forming gas atmosphere composed of about 90% nitrogen and about 10% hydrogen and water vapor thereby to form a layer of chromium oxide on the outer surface of the third layer composed of chromium whereby the outer layer of chromium oxide renders the laminated parallel lines passive or non-reactive to subsequent high temperature operations and protects the laminated parallel lines on each glass plate from attack and destruction,
   2. Spraying a slurry composed of a finely ground glass frit, uniformly dispursed in a suspension vehicle on each glass plate to cover all of the laminated parallel lines on each glass plate with a uniform depth of such slurry, drying the slurry, and
   3. firing each plate in an oven to reflow the glass frit which adheres to each glass plate thereby to form a protective glass coating of uniform depth over all of the laminated parallel lines of each glass plate whereby the laminated parallel lines are protected from mechanical stress and shock during subsequent handling operations, from attack and erosion when the two glass plates later are sealed around the periphery in a firing operation thereby to form a chamber therebetween for holding an illuminable gas, and from interaction with the illuminable gas when the chamber is filled thereafter with such gas.

2. The method of claim 1 wherein step 2 is performed using spray gun equipment with regulated blower pressure and regulated speed of relative movement between the spray gun the surface of the glass plates thereby to provide accurate control of the thickness of the mixture sprayed over the laminated parallel lines.

3. The method of claim 1 wherein step 3 is performed by disposing the assembly on polished lava plates leveled with a machinist's level to be flat and parallel within 0.0002 inches per inch or better.

4. In a method of constructing a gas panel with two glass plates spaced apart a given distance and sealed around the periphery thereof to form a chamber therebetween for holding an illuminable gas, each glass plate having parallel lines which serve as electrical conductors disposed thereon adjacent to the chamber with the parallel lines on one plate extending orthogonally to the parallel lines on the other plate, each parallel line on each glass plate being composed of a laminate which includes a first layer composed of chromium disposed on each glass plate, a second layer composed of copper disposed on the first layer, and a third layer composed of chromium disposed on the second layer, the improved method of placing a protective coating over the parallel lines comprising the steps of:
   1. heating each glass plate in a forming gas atmosphere plus water vapor to form a layer of chromium oxide on the outer surface of the third layer composed of chromium whereby the outer layer of chromium oxide renders the laminated parallel lines passive or non-reactive to subsequent firing operations and protects the laminated parallel lines on each glass plate from attack and destruction,
   2. spraying a finely ground glass frit in a suspension vehicle with spray gun equipment having regulated blower pressure and regulated speed of movement relative to the surface of the glass plates thereby to deposit the mixture at a uniform depth over the laminated parallel lines on each glass plate, and
   3. placing each glass plate on a level surface in an oven and firing the assembly to reflow the glass frit which then adheres to each glass plate and forms a protective glass coating of uniform depth over all of the laminated parallel lines of each glass plate, and cooling the assembly gradually to room temperature, whereby the laminated parallel lines thereafter are protected from mechanical stress and shock during subsequent handling operations, from attack and erosion when the two glass plates later are sealed around the periphery in a firing operation which forms a chamber therebetween for holding an illuminable gas, and from interaction with illuminable gas when the chamber is filled thereafter with such gas.

5. The method of placing a protective glass coating over parallel lines disposed on a glass plate where the parallel lines serve as electrical conductors, each parallel line on the glass plate being composed of a laminate which includes a first layer composed of chromium disposed on the glass plate, a second layer composed of copper disposed on the first layer, a third layer composed of chromium disposed on the second layer, said method of placing a protective coating over the parallel lines comprising the steps of:

1. heating each glass plate in a forming gas atmosphere plus water vapor to form a layer of chromium oxide on the outer surface of the third layer composed of chromium whereby the outer layer of chromium oxide renders the laminated parallel lines passive or non-reactive to subsequent firing operations and protects the laminated parallel lines on each glass plate from attack and destruction,
2. spraying a finely ground glass frit in a suspension vehicle on each glass plate to cover all of the laminated parallel lines on each glass plate with a uniform depth of such mixture, and
3. firing each glass plate in an oven to reflow the glass frit which adheres to each glass plate thereby to form a protective glass coating of uniform depth over all of the laminated parallel lines of each glass plate, whereby the laminated parallel lines are protected from mechanical stress and shock during subsequent handling operations, from attack and erosion when the two glass plates later are sealed around the periphery in a firing operation thereby to form a chamber therebetween for holding an illuminable gas, and from interaction with the illuminable gas when the chamber is filled thereafter with such gas.

6. The method of claim 5 wherein step 2 is performed using spray gun equipment with regulated blower pressure and regulated speed of movement relative to the surface of the glass plate thereby to provide accurate control of the thickness of the mixture deposited on the laminated parallel lines.

7. The method of claim 6 wherein step 3 is performed by placing the assembly on a platform leveled with a machinist's level to be flat and parallel within 0.002 inches per inch.

8. In a method of constructing a gas panel with two glass plates spaced apart a given distance and sealed around the periphery thereof to form a chamber therebetween for holding an illuminable gas, each glass plate having parallel lines which serve as electrical conductors disposed thereon adjacent to the chamber with the parallel lines on one plate extending orthogonally to the parallel lines on the other plate, each parallel line on each glass plate being composed of a laminate which includes a first layer composed of chromium disposed on each glass plate, a second layer composed of copper disposed on the first layer, and a third layer composed of chromium disposed on the second layer, the improved method of placing a protective coating over the parallel lines comprising the steps of:

1. heating each glass plate in a forming gas atmosphere composed of about 90% nitrogen, about 10% hydrogen and water vapor to form a layer of chromium oxide on the outer surface of the third layer composed of chromium whereby said outer layer of chromium oxide renders the laminated parallel lines passive or non-reactive to glass in subsequent firing operations and protects the laminated parallel lines on each glass plate from attack and destruction.
2. spraying a finely ground glass frit in a suspension vehicle over the laminated parallel lines with spray gun equipment having regulated blower pressure and regulated speed of movement relative to the surface of the glass plates thereby to deposit the mixture at a uniform depth over the laminated parallel lines on each glass plate, and
3. placing each glass plate on a level surface in an oven and firing the assembly to reflow the glass frit which then adheres to each glass plate and forms a protective glass coating of uniform depth over all of the laminated parallel lines of each glass plate, and cooling the assembly to room temperature, whereby the laminated parallel lines thereafter are protected from mechanical stress and shock during subsequent handling operations, from attack and erosion when the two glass plates later are sealed around the periphery in a firing operation which forms a chamber therebetween for holding an illuminable gas, and from interaction with illuminable gas when the chamber is filled thereafter with such gas.

9. In a method of constructing a gas panel with two glass plates spaced apart a given distance and sealed around the periphery thereof to to form a chamber therebetween for holding an illuminable gas, each glass plate having parallel lines which serve as electrical conductors disposed thereon adjacent to the chamber with the parallel lines on one plate extending orthogonally to the parallel lines on the other plate, each parallel line on each glass plate being composed of a laminate which includes a first layer composed of chromium disposed on each glass plate, a second layer composed of copper disposed on the first layer, and a third layer composed of chromium disposed on the second layer, the improved method of placing a protective coating over the parallel lines comprising the steps of:

1. heating each glass plate in a forming gas atmosphere composed of nitrogen and hydrogen plus water vapor to form a layer of chromium oxide on the outer surface of the third layer composed of chromium whereby the outer layer of chromium oxide renders the laminated parallel lines passive or non-reactive to glass in subsequent firing operations and protects the laminated parallel lines on each glass plate from attack and destruction,
2. spraying a finely ground glass frit in a suspension vehicle over the laminated parallel lines with spray gun equipment having regulated blower pressure and regulated speed of movement relative to the surface of the glass plates thereby to deposit the mixture at a uniform depth over the laminated parallel lines on each glass plate, and 3. placing each glass plate on a level surface in an oven and firing the assembly to reflow the glass frit which then adheres to each glass plate and forms a protective glass coating of uniform depth over all of the laminated parallel lines of each glass plate, and cooling the assembly to room temperature, whereby the laminated parallel lines thereafter are protected from mechanical stress and shock during subsequent handling operations, from attack and erosion when the two glass plates later are sealed around the periphery in a firing operation which forms a chamber therebetween for holding an illuminable gas, and from interaction with illuminable gas when the chamber is filled thereafter with such gas.

10. The method of rendering passive or non-reactive laminated parallel lines disposed on a substrate where the parallel lines serve as electrical conductors, each parallel line on the substrate being composed of a laminate which includes a first layer composed of chromium disposed on the substrate, a second layer composed of copper disposed on the first layer, a third layer composed of chromium disposed on the second layer, and a fourth layer of glass disposed on the third layer, said method comprising the steps of:

heating the substrate in a forming gas atmosphere plus water vapor to form a layer of chromium oxide on the outer surface of the third layer composed of chromium whereby the layer of chromium oxide renders the laminated parallel lines passive or non-reactive to glass in subsequent reflow firing operations and thereby protects the laminated parallel lines on the substrate from attack and destruction.

11. The method of claim 10 wherein the forming gas atmosphere is composed of about 90% nitrogen, about 10% hydrogen, and a minute quantity of water vapor.

* * * * *